(12) United States Patent
Pande et al.

(10) Patent No.: US 8,930,136 B2
(45) Date of Patent: Jan. 6, 2015

(54) STATIC HEADING DETECTION IN PERSONAL NAVIGATION DEVICE

(75) Inventors: Tarkesh Pande, Dallas, TX (US); Jaiganesh Balakrishnan, Bangalore (IN); Deric Waters, Dallas, TX (US); Goutam Dutta, Bangalore (IN); Jayawardan Janardhanan, Bangalore (IN); Sthanunathan Ramakrishnan, Bangalore (IN); Sandeep Rao, Bangalore (IN); Karthik Ramasubramanian, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 925 days.

(21) Appl. No.: 13/078,748

(22) Filed: Apr. 1, 2011

(65) Prior Publication Data
US 2011/0250931 A1 Oct. 13, 2011

Related U.S. Application Data

(60) Provisional application No. 61/322,143, filed on Apr. 8, 2010.

(51) Int. Cl.
| | |
|---|---|
| *G01C 21/10* | (2006.01) |
| *G01C 22/00* | (2006.01) |
| *G01S 19/47* | (2010.01) |
| *G01C 21/16* | (2006.01) |

(52) U.S. Cl.
CPC ............ *G01S 19/47* (2013.01); *G01C 21/165* (2013.01)
USPC ........ 701/457; 701/468; 701/495; 342/357.2; 342/357.4; 702/96; 73/503

(58) Field of Classification Search
USPC ............... 455/457, 456.1; 701/500, 505, 472, 701/468–470, 495; 342/357.48, 357.3, 342/357.67; 702/96; 73/503
See application file for complete search history.

(56) References Cited

U.S. PATENT DOCUMENTS

| | | | |
|---|---|---|---|
| 5,752,220 A * | 5/1998 | Geier | 701/495 |
| 2010/0073227 A1 | 3/2010 | Waters et al. | |
| 2010/0079334 A1 | 4/2010 | Roh et al. | |
| 2010/0171659 A1 | 7/2010 | Waters et al. | |

OTHER PUBLICATIONS

Michael J. Caruso, "Applications of Magnetic Sensors for Low Cost Compass Systems", IEEE 2000 Position Location and Navigation Symposium, meeting dates Mar. 13-16, 2000, San Diego, CA, current version Aug. 6, 2002, pp. 177-184.

Gamini Dissanayake et al, "The Aiding of a Low-Cost Strapdown Inertial Measurement Unit using Vehicle Model Constraints for Land Vehicle Applications", IEEE Transactions on Robotics and Automation, vol. 17, No. 5, Oct. 2001, pp. 731-747.

\* cited by examiner

*Primary Examiner* — Adam Tissot
(74) *Attorney, Agent, or Firm* — Alan A. R. Cooper; Frederick J. Telecky, Jr.

(57) ABSTRACT

A personal navigation device configured to determine heading readings continuously using data from a sensor in the personal navigation device. Heading readings are selected corresponding to a periodic event. A representative heading is determined from the selected heading readings. When a portion of the selected heading readings has a value within a range of the representative heading, a static heading indicator is asserted to indicate the personal navigation device is moving in a static heading. The static heading indicator may be used to smooth an estimated trajectory of the personal navigation device.

18 Claims, 8 Drawing Sheets

STATIC HEADING DETECTION IN PERSONAL NAVIGATION DEVICE

CLAIM OF PRIORITY UNDER 35 U.S.C. 119 ((a) FOREIGN, (e) PROVISIONAL)

The present application claims priority to and incorporates by reference U.S. Provisional Application No. 61/322,143, filed Apr. 8, 2010 entitled "Use Of A Static Heading Under Motion Indicator to Improve Position Fixes."

BACKGROUND OF THE INVENTION

A Global Navigation Satellite system (GNSS) satellite-based navigation system may suffer from performance degradation when satellite signals are unavailable, blocked, attenuated and/or reflected. Example locations where the satellite-based navigation system suffer from performance degradation may include indoors and/or urban canyons.

The introduction of global positioning system (GPS) capability into smart phones has resulted in a high consumer demand for indoor and urban-canyon geo-location services. Since the performance of GPS by itself is poor in urban-canyon environments, other technologies are being developed to compliment or assist GPS for this important use case. One such technology is micro-electrical-mechanical system (MEMS) sensor based assistance. Some examples of such sensors are accelerometers, e-compass, gyroscopes and altimeters. A MEMS gyroscope may be implemented as a vibrating structure. A MEMS accelerometer may be implemented using a cantilever beam with a proof mass and incorporating a piezoelectric, piezoresistive or capacitive components for sensing. A tilt-compensated handheld electronic compass typically uses a dual-axis accelerometer as a tilt sensor, electronically gimbaling X, Y and Z magnetic field sensors. Magnetic field sensors require a horizontal orientation to the earth's surface at all times; therefore tilt data provided by an accelerometer or accelerometer+gyroscope is required for detilting e-compass measurements in order to get horizontal field components, when the e-compass is arbitrarily oriented, such as when a device is being carried by a user.

Sensor information has been shown to help GPS provide a more accurate navigation solution in urban canyon environments, e.g.: Gamini Dissanayake, et al, "The aiding of a Low-cost Strap-down Inertial Measurement Unit Using Vehicle Model Constraints for Land Vehicle Applications". This is typically done by first deriving an INS (inertial navigation solution) fix from sensor information with some calibration assistance from GPS, followed by a blending of the INS solution with the GPS solution to get a more accurate position fix.

BRIEF DESCRIPTION OF THE DRAWINGS

Particular embodiments in accordance with the invention will now be described, by way of example only, and with reference to the accompanying drawings.

Figure 1:
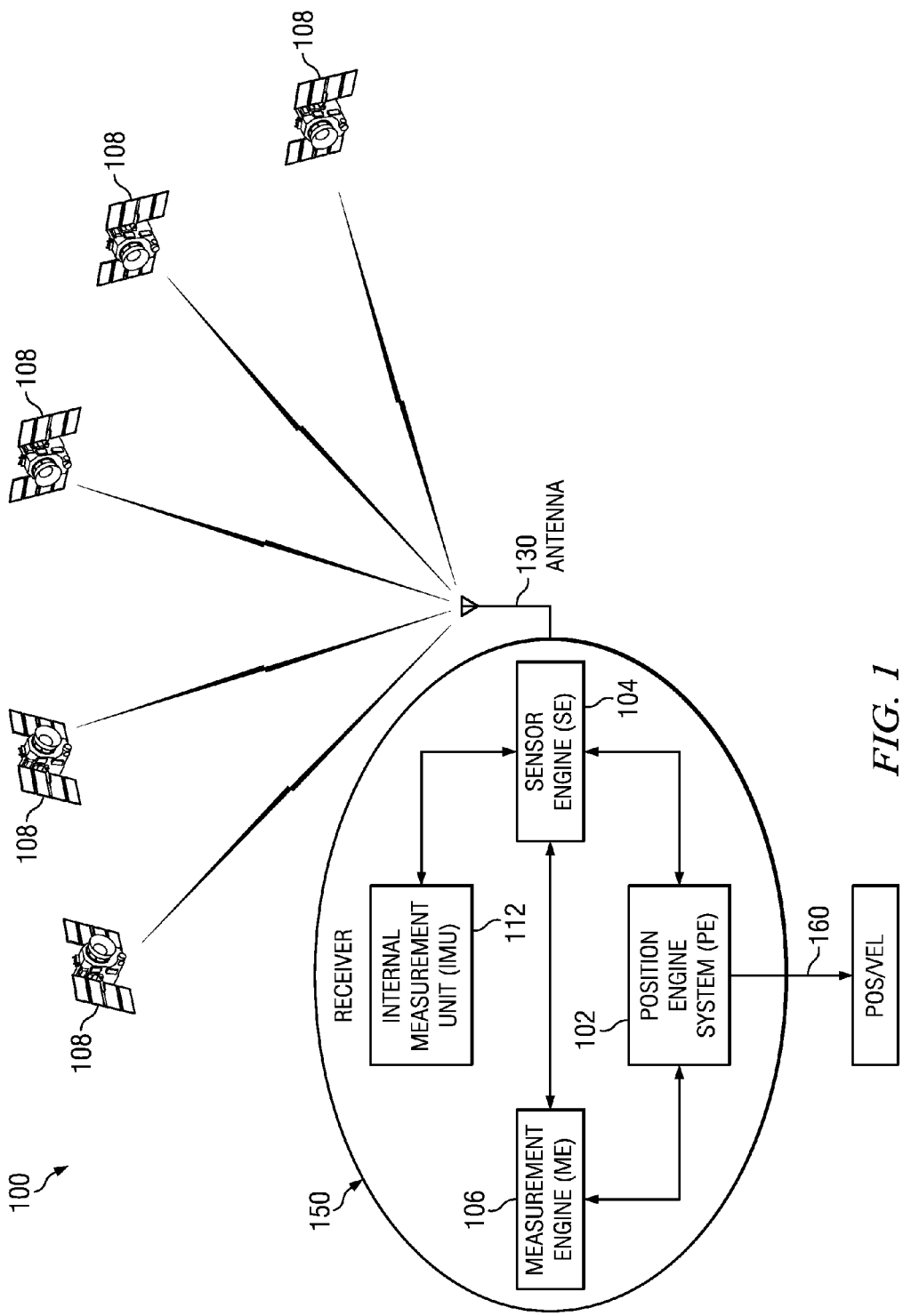
FIG. 1 is a system view of a receiver in a personal navigation device, according to one or more embodiments of the invention.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In order to get an accurate INS solution it is required to have a minimum of a 6DoF (six degrees of freedom) solution typically using accelerometers and gyroscopes. 6DoF refers to motion of a rigid body in three-dimensional space, namely the ability to move forward/backward, up/down, left/right (translation in three perpendicular axes) combined with rotation about three perpendicular axes (pitch, yaw, roll). Because of cost/power/area constraints, the current generation of smart phones does not have gyroscopes and instead may have an e-compass from which heading information may be derived.

Unfortunately, it is well known that e-compass heading readings are not accurate in the presence of magnetic disturbances otherwise known as hard and soft-iron effects. This may result in bias in the heading readings which may be difficult to calibrate out in urban-canyon environments. Furthermore, in unstrapped pedestrian navigation scenarios, for example where a user is carrying a mobile device in their hand or pocket, it may not be possible to keep track of attitude changes in the e-compass especially if a gyroscope is not present which will in turn result in errors in the heading computed. However, in various embodiments of the invention, qualitative type information such as motion in a straight-line or 90 degree turns may be mined and may be used by the GPS receiver to improve the quality of the position fix.

In this disclosure, methods are provided for deriving whether a user is moving in a straight line, termed static-heading under motion indicator (SHUMI) information. Once it is known that a user is moving in a static heading scenario, the GPS receiver may use that information to further refine or smooth its position and velocity estimates. In some embodiments the smoothed position and velocity estimates may in turn be used to derive a heading estimate which may then be used to re-calibrate the e-compass or sensor based heading readings.

SHUMI information may be provided directly as input to a position engine of a GNSS receiver for computing position information. In another configuration, it may be provided through a sensor engine that would provide flexibility of changing sensors without affecting the functioning of a position engine.

FIG. 1 is a system view 100 of a Global Navigation Satellite system (GNSS). The GNSS system may include a constellation of global positioning system (GPS) satellites 108, also referred to as space vehicles (SV), and a receiver 150. Receiver 150 may be based on a traditional GNSS receiver architecture that is improved to include an embodiment of the invention. In one or more embodiments, receiver 150 may include an Inertial Measurement Unit (IMU) 112, a Measurement Engine (ME) 106 and a Position Engine (PE) system 102. PE system 102 may be configured with one or more interfaces to receive sensor input through IMU 112. IMU 112 may include inertial sensors such as accelerometer(s) and/or gyroscope(s) and/or E-compass's and/or Altimeters that may provide acceleration data, angular data, heading data and/or height data respectively as the sensor input.

PE system 102 of receiver 150 may include a memory component such as a Read Only Memory (ROM). The memory component may include a firmware. In one or more embodiments, the firmware may be configured to detect a spatial inertial change of the receiver 150 and to compute an acceleration profile based on the sensor input obtained through the IMU 112. In one or more embodiments, the firmware may be an Inertial Navigation System (INS) calibration component that is hardwired in the ROM of the PE system 102.

Sensor engine 104 may be configured to perform a runtime calibration using variable data received from the various INS sensors within IMU 112 and positioning data received from position engine 102. A processor within receiver 150 may perform receiver autonomous integrity monitoring (RAIM) and implement a Kalman filter to provide fixed format intermediate data for use by position engine 102. The Kalman filter produces estimates of the true values of measurements and their associated calculated values by predicting a value, estimating the uncertainty of the predicted value, and computing a weighted average of the predicted value and the measured value. The most weight is given to the value with the least uncertainty. The estimates produced by the method tend to be closer to the true values than the original measurements because the weighted average has a better estimated uncertainty than either of the values that went into the weighted average. In one embodiment, the fixed format intermediate data may be net acceleration profile data. In one or more embodiments, the net acceleration profile data may be an average acceleration profile that takes into account uncertainty data from an algorithm that compares a short-term accuracy of inertial guidance with a longer term accuracy of the satellite data.

Receiver 150 may include an antenna 130 designed to receive data from satellites 108 (or alternatively, a pseudolite or any other positioning system). Antenna 130 may be configured to receive positioning data from the constellation of satellites 108. Generally, data must be received from a minimum of four satellites or other positioning system sources in order to calculate an accurate position fix. With good visibility, receiver 150 may utilize data from seven or more satellites 108 while calculating a position fix. In one or more embodiments, the positioning data may include, but is not limited to, satellite pseudo range data, satellite vehicle information and Doppler signals. In one embodiment, the positioning data received through the antenna 130 may be processed by the ME 106 to generate a measurement data to be communicated to the PE system 102.

PE system 102 may also include a dedicated interface to receive positioning data from ME 106. The acceleration profile and the positioning data may be used by PE system 102 to generate an output 160. The output generated by PE system 102 may be velocity vector data and position vector data corresponding to a trajectory of receiver 150.

In one or more embodiments, PE system 102 of receiver 150 may be implemented as a fixed architecture and hardwired in a circuit such as an Application Specific Integrated Circuit (ASIC). In one embodiment, the PE system 102 may be tight-coupled architecture. The firmware (e.g., INS) in PE system 102 may be designed considering a set of predetermined inertial sensors and may be executed for computing an output based on the sensor input obtained through the inertial sensors at a predetermined data rate. In another embodiment, PE system 102 may be implemented by using software executed on a processor, for example, to provide flexibility for processing with variable input data and various INS sensors.

Obtaining Static Heading Under Motion Information

In the processing improvements that will now be described, it is assumed that the sensor block within IMU 112 provides heading information continuously. The heading information may be derived from an e-compass based solution or a gyro solution or a gyro+e-compass blended solution. Without loss of generality, the following description assumes that the sensor block includes an accelerometer and an e-compass. However, in other embodiments other combinations of IMU sensors may be used.

In pedestrian navigation, a user may hold a PND (personal navigation device) in several different configurations, some examples of which are: a) strapped to a PND holder on a belt; b) in the shirt pocket; c) in the pant pocket; d) in the user's hands. In such scenarios, when the user is moving in a straight line the attitude or orientation change in the PND device will be nearly periodic with respect to the users stride frequency. In this case, the attitude of the sensor configuration will be nearly the same at every step-event resulting in the heading reading at every step event or every other step event being nearly the same.

Figure 2:
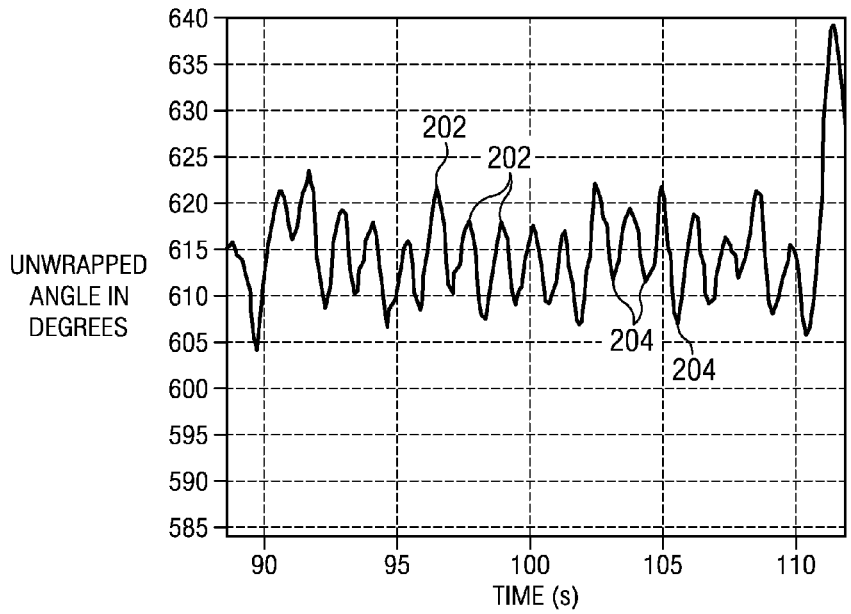
FIG. 2 is a plot illustrating an example of heading readings while walking in a straight line from an accelerometer plus an e-compass configuration of sensors.

FIG. 2 is a plot illustrating an example of heading readings while walking in a straight line from an accelerometer plus an e-compass configuration of sensors in a PND that is strapped to a user's belt. A step event may be defined as an event which happens once every step based on an accelerometer profile. A few examples of step events include, and are by no means limited to: a) zero-crossings of the band-pass-filtered accelerometer magnitude response; b) peak of the accelerometer magnitude response; c) trough of the accelerometer magnitude response. A number (X) of heading readings are assigned per step where X may be as low as 1. In some embodiments an averaged heading reading is taken between step events. A series of peak responses is indicated at 202 and a series of troughs is indicated at 204.

Figure 3:
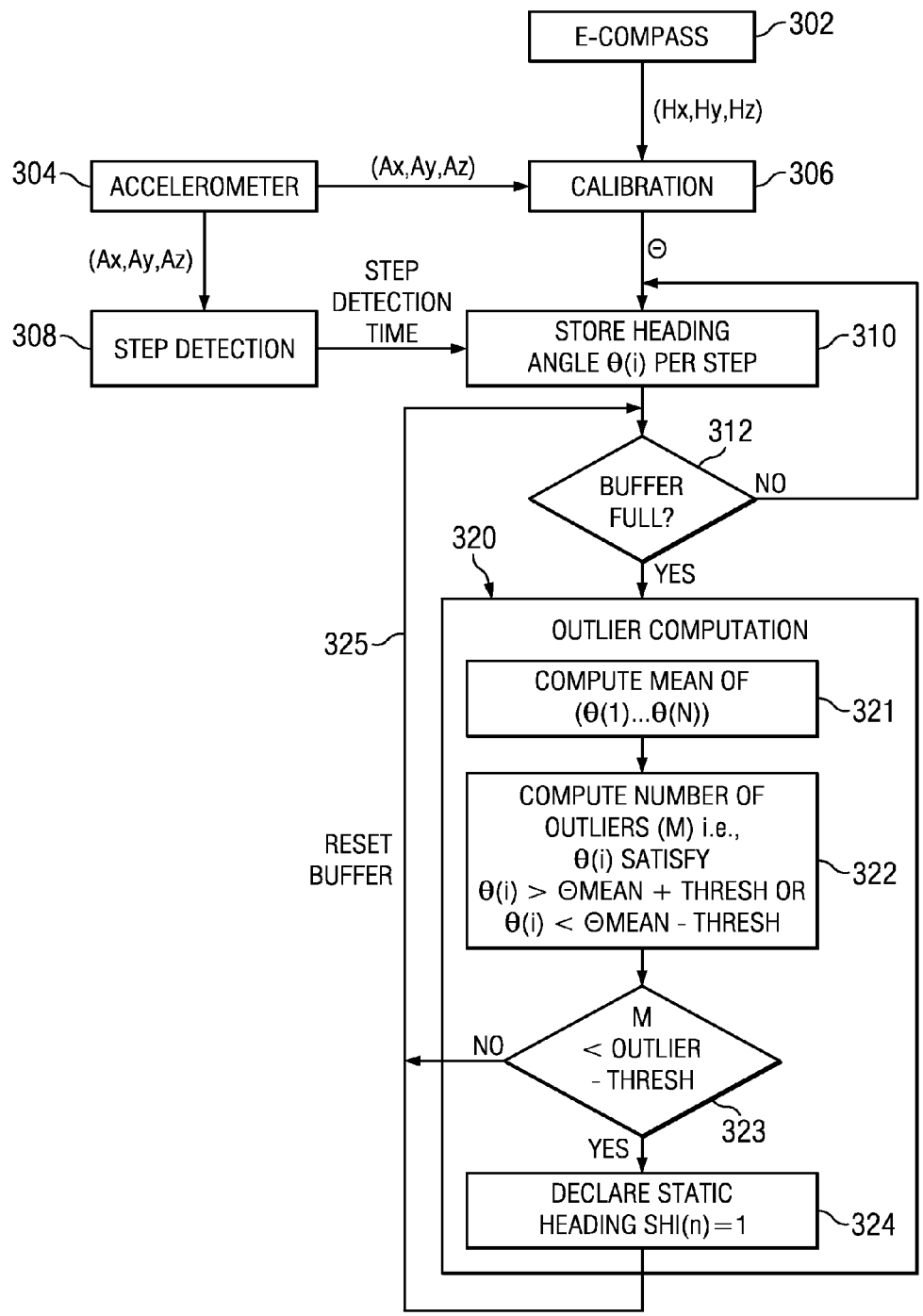
FIGS. 3-5 are flow diagrams illustrating computation of a static heading indicator.
Figure 4:
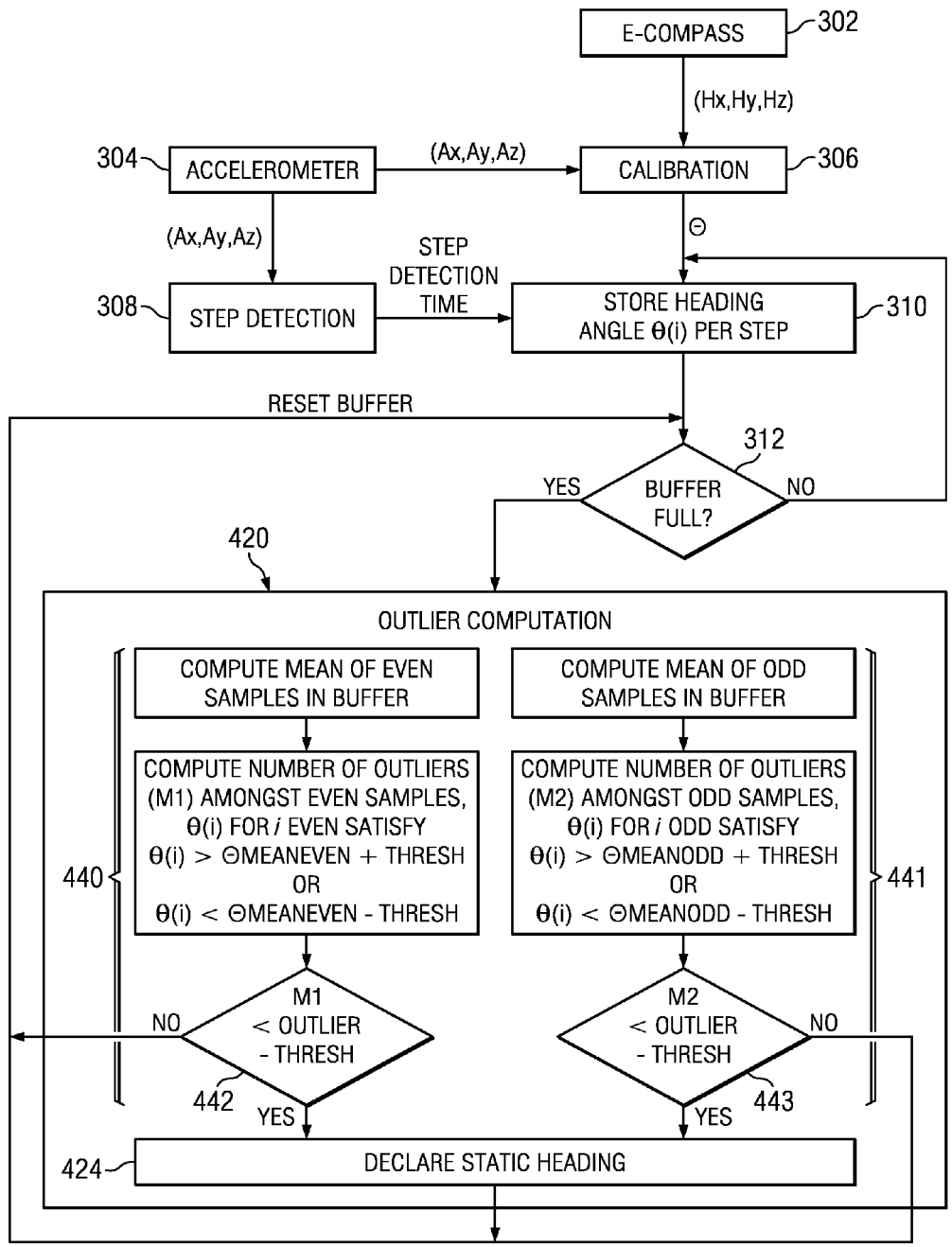
Figure 5:
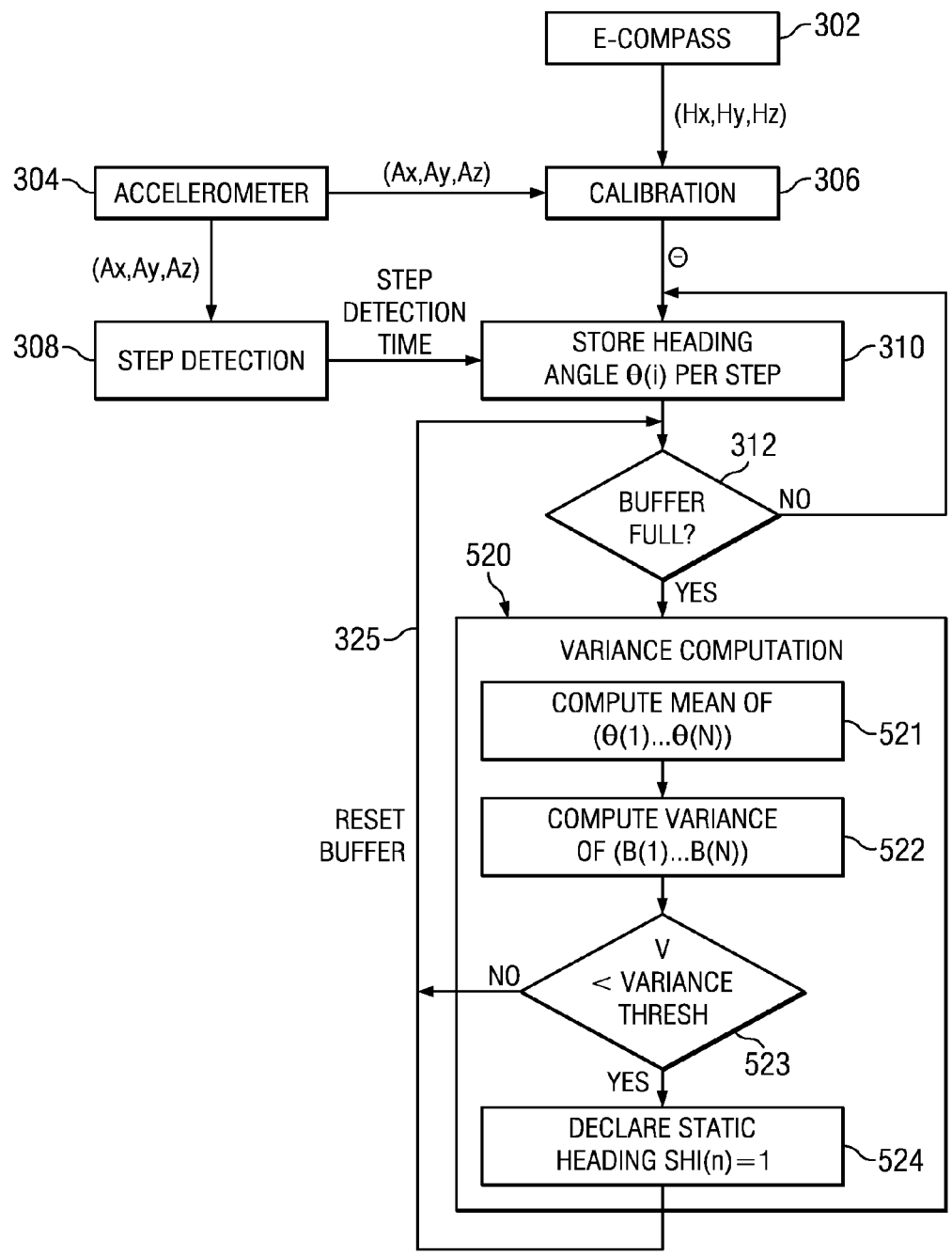

FIGS. 3, 4, and 5 are flow diagrams illustrating computation of a static heading indicator within a personal navigation device (PND). Various embodiments may derive whether a user is moving in a straight line. This information may be derived in different ways depending on the sensor suite configuration and the user usage mode. Some examples of sensor suite configurations are: a) accelerometers+e-compass; b) accelerometers+gyroscopes; c) accelerometers+e-compass's+gyroscopes. Some examples of usage modes are: a) pedestrian navigation; b) vehicular navigation.

In the embodiment illustrated in FIG. 3, heading angles per step, denoted as θ(i), are stored 310 in a buffer of length N within the PND. In order to determine a heading angle for each step, step detection logic 308 analyzes a stream of acceleration information (Ax, Ay, Az) provided 304 by an accelerometer located within the PND. Referring again to FIG. 2, step detection logic 308 detects step events in the stream of acceleration information, such as peaks 202 or troughs 204, in order to infer that the PND is being carried by a user that is walking.

Heading information (Hx, Hy, Hz) is provided 302 by an e-compass located within the PND. The raw heading information provided 302 by the e-compass may be calibrated 306 using acceleration information (Ax, Ay, Az) provided 304 by the accelerometer.

Once the buffer is full 312, an outlier computation 320 is performed on the set of step-wise heading angles stored in the buffer to determine if at least a portion of the selected headings stored in the buffer have a value that is within a defined range. A mean value of the set of heading angles is computed 321 and upper and lower thresholds are calculated that define the range. The range of the thresholds may be a function of the buffer length and determine the reliability with which a user is said to be walking in a straight line. Next, outliers, or the number of samples in the buffer not within the upper and lower threshold limits, are determined 322 and compared 323 against an outlier Threshold (M). If the number of outliers is less than M, then the PND is determined 324 to be moving in the same direction. A static heading indicator is asserted; this may be done by setting a bit in a status/control register, asserting a signal line, etc. The static heading indicator may then be used by other functions within the PND to improve position estimates. The reliability of the static heading indicator may be improved by lengthening the buffer. A reliability measure may also be provided to the other functions that will make use of the static heading indication.

The buffer may be reset 325 and flushed after its full, in which case a static heading determination is determined once every N samples. Alternatively, the buffer may be operated as a circular buffer and a static heading determination may be made on a sample by sample basis. In some embodiments, the mean values of the samples in the buffer are stored and over time compared with one another to see if the PND is still moving in the same direction.

FIG. 4 illustrates another embodiment in which static heading indicator information is computed 420 based on processing that is done separately on the odd samples 441 in the buffer and separately on the even 440 samples. The number of odd sample outliers in the buffer not within the upper and lower threshold limits are determined and compared 443 against an outlier Threshold (M1), and the number of even sample outliers in the buffer not within the upper and lower threshold limits are determined and compared 442 against an outlier Threshold (M2). If either the number of odd outliers is less than M1 or the number of even outliers is less than M2, then the PND is determined 424 to be moving in the same direction and a static heading indicator is asserted for use by other functions within the PND to improve position estimates.

FIG. 5 illustrates another embodiment in which once buffer 312 is full, a variance computation 520 is performed on the set of step-wise heading angles stored in the buffer to determine if at least a portion of the selected headings stored in the buffer have a variance value that is within a defined range. A variance of the heading angles stored in the buffer is computed 522. The computed variance is then compared 523 to a variance threshold (V). The variance threshold defines the range of the variance and may be a function of the buffer length and determine the reliability with which a user is said to be walking in a straight line. If the variance is less than V, then the PND is determined 524 to be moving in the same direction and a static heading indicator is asserted for use by other functions within the PND to improve position estimates. A mean value of the set of heading angles stored in the buffer may be computed 521 and may be used as the static heading value.

staticHeading=1 if $\text{var}(\theta_1 \ldots \theta_N)$<threshVar
staticHeading=0 if $\text{var}(\theta_1 \ldots \theta_N)$≥threshVar A reliability metric for the static heading indicator may also be passed on to the positioning algorithm which in this embodiment is the GPS position engine (PE). The reliability metric may consist of the number of outliers or it may be some function of the samples in the buffer such as standard deviation or variance of the samples. The positioning algorithm may choose to use or ignore the heading indicator to perform smoothing based on the reliability metric.

For a navigation system mounted in a vehicle, the heading information from an E-compass or Gyro+E-compass may be stored on a second by second basis in place of performing step detection. Similarly, when a user carries a portable PND while in a vehicle, the PND may store heading provided by an E-compass on a second by second basis when step detection function 308 does not detect periodic step events. In this manner, heading information is selected and stored in a buffer in a periodic manner using a time based periodic event.

Use of Static Heading Under Motion Information to Improve Position Fixes

Figure 6:
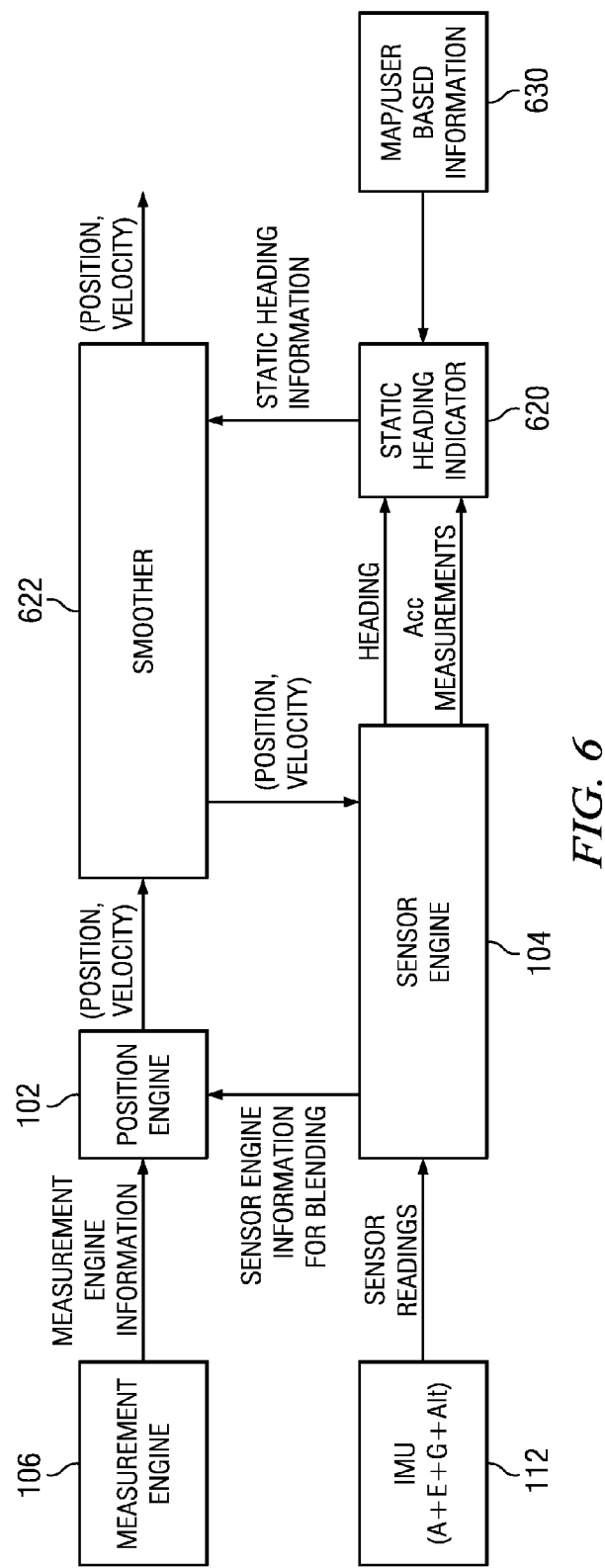
FIG. 6 is a block diagram of a personal navigation device in which static heading information is used external to a position engine.

FIG. 6 is a block diagram of a personal navigation device in which static heading information is used external to position engine 102. Position engine 102 receives measurement engine information from measurement engine 106 and provides position and velocity estimates to an external smoother 622. Static heading logic 620 may determine static heading information as described in more detail with respect to FIG. 3 or FIG. 4 and provides the static heading information to smoother 622. Several different smoothing operations may be possible; such as: least squares based smoothing or Kalman Filter based smoothing.

For example, least squares based smoothing may be used to fit a straight line trajectory to the position and velocity estimates when static heading indicator 620 indicates the PND is moving in a straight line, even when the position and velocity estimates from position engine 102 are ambiguous.

Figure 7:
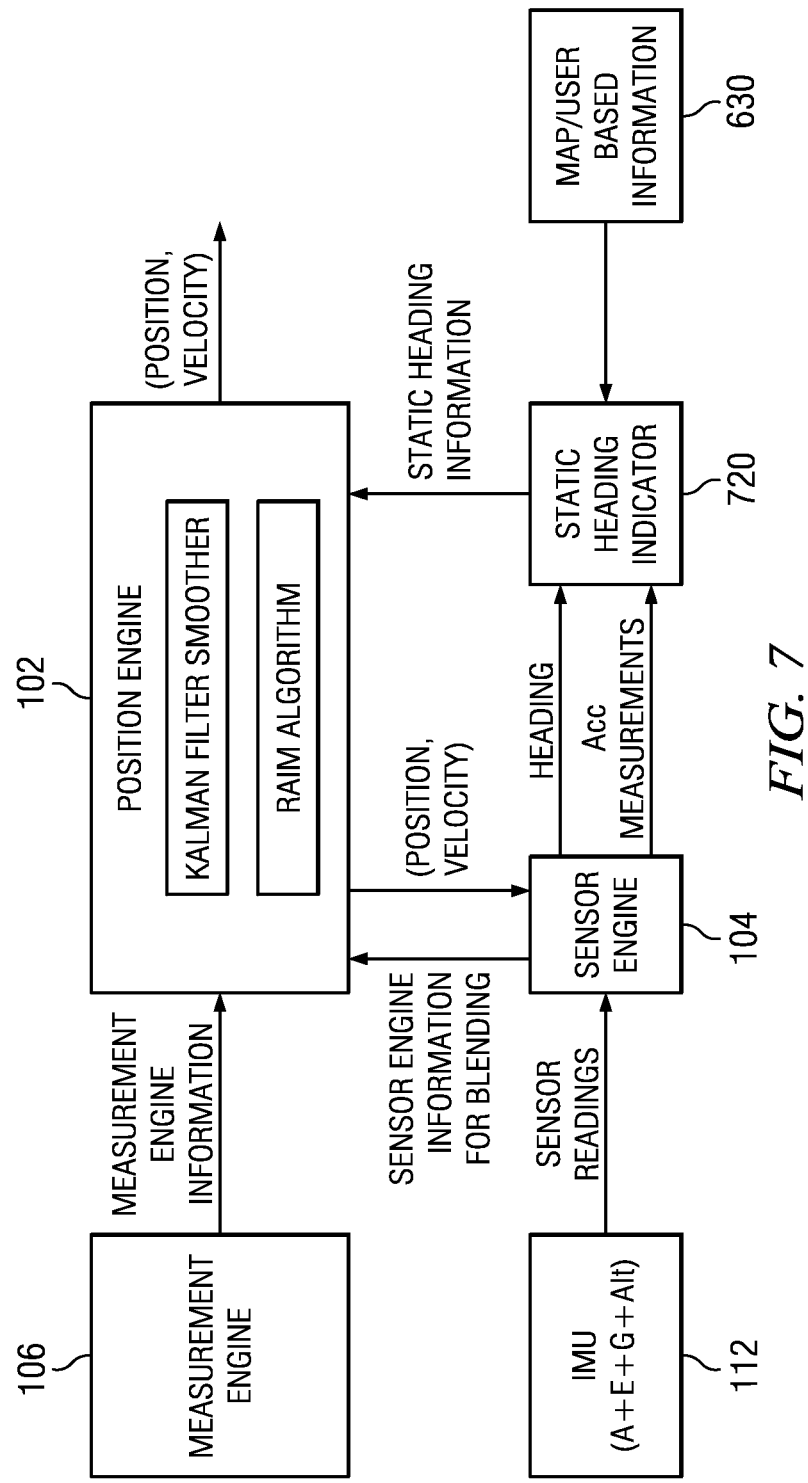
FIG. 7 is a block diagram of a personal navigation device in which static heading information is used internally to the position engine.

FIG. 7 is a block diagram of a personal navigation device in which static heading information is used internally to position engine 102. In this embodiment, the static heading information from static heading indicator 720 may be used both in the RAIM algorithm and the Kalman filter smoothing performed by position engine 102. As an example of RAIM participation, in some embodiments the direction of arrival information from the SV's used to get the position fixes is noted. If it is known that the user is moving in a straight line (static heading), then the direction of arrival information for each of the SV's can be checked to see if it is consistent with straight line motion. When the direction of arrival information for an SV is not consistent with straight line motion, then information from that SV may be flagged, discarded or have its measurement noise increased when computing a position fix.

Figure 8:
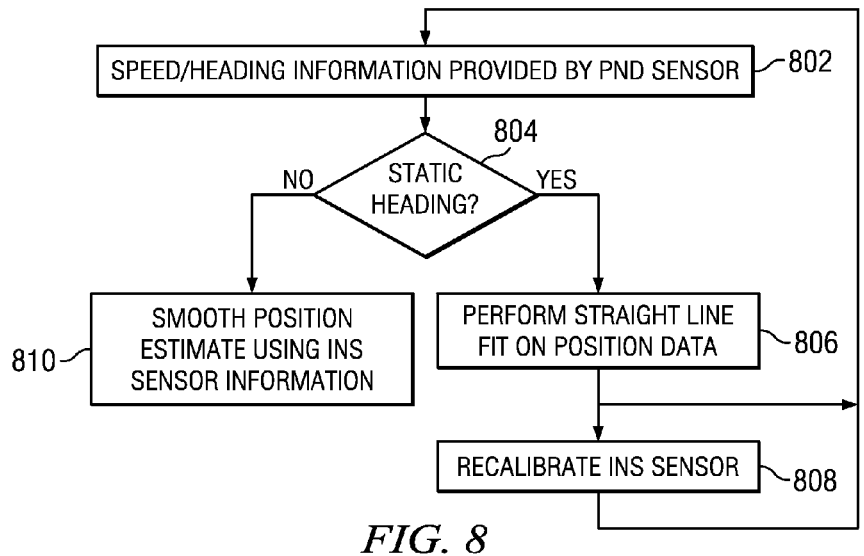
FIG. 8 is a flow diagram illustrating calibration of sensors using static heading information.

Use of Static Heading Under Motion Information to Re-Calibrate Heading in the Sensor Engine FIG. 8 is a flow diagram illustrating calibration of a sensor using static heading information in a PND. In some embodiments, sensor engine provides 802 speed/heading (velocity) information for smoothing 810 by the position engine. The sensor engine itself may have a Kalman filter with heading as state which reflects heading measurements from an E-compass or Gyro or a combination of both. Static heading logic may process 804 the heading information as described in more detail above to determine if a user of the PND is heading in a straight line. When it is known that a user is moving in the same direction, then the heading may be accurately computed by performing 806 a straight line-fit on the position or velocity measurements and deriving the heading from the smoothed estimates. This averaged heading may be used to recalibrate 808 or reinitialize the sensor engine heading.

For example, when a user is near a large mass of metal, such as a building structure or in a vehicle, the E-compass heading information may be disturbed. For instance, a true heading may be 30 degrees, but the E-compass may indicate a heading of 45 degrees due to a nearby metal mass. However, the static heading logic described above may still be able to determine the user is moving in a straight line and this knowledge can then be used to recalibrate the E-compass to compensate for the mass of metal.

System Example

Figure 9:
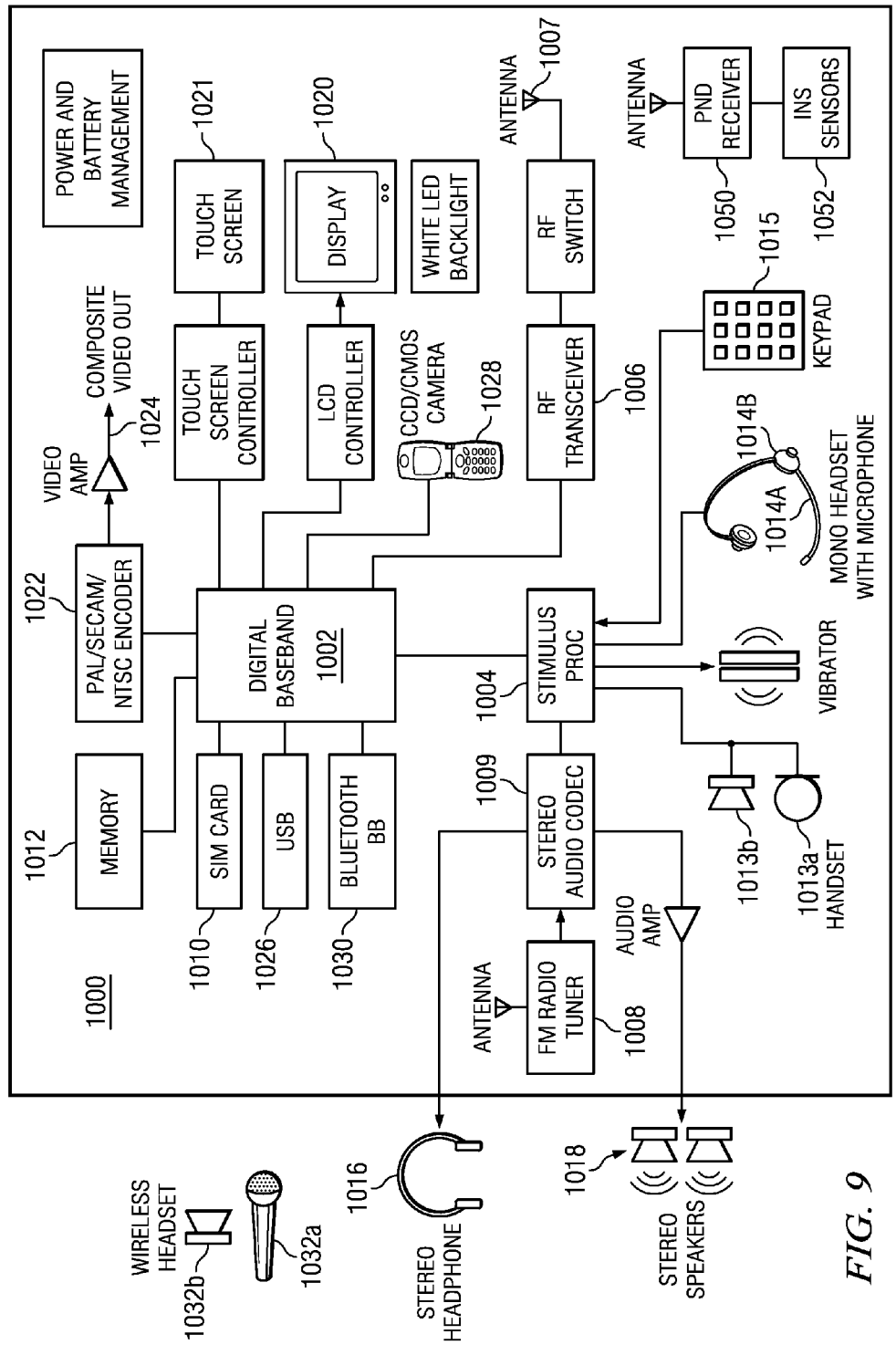
FIG. 9 is a block diagram of a user device that includes a personal navigation device.

FIG. 9 is a block diagram of an exemplary mobile cellular phone 1000 that includes an embodiment of the present invention. Digital baseband (DBB) unit 1002 may include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

Personal navigation device receiver 1050 may be implemented as described above and coupled to a set of inertial sensors 1052. Inertial sensors 1052 may include accelerometer(s) and/or gyroscope(s) and/or E-compass's and/or Altimeters that may provide acceleration data, angular data, heading data and/or height data respectively as the sensor input. Position/trajectory information determined by PND 1050 may be displayed on display 1020. PND receiver 1050 may determine static heading while in motion as described in more detail above and use this information to smooth/improve trajectory information as described above.

RF transceiver 1006 is a digital radio processor and includes a receiver for receiving a stream of coded data frames from a cellular base station via antenna 1007 and a transmitter for transmitting a stream of coded data frames to the cellular base station via antenna 1007. RF transceiver 1006 is coupled to DBB 1002 which provides processing of the frames of encoded data being received and transmitted by cell phone 1000.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Touch screen 1021 may be connected to DBB 1002 for haptic feedback. Display 1020 may also display pictures received from the network, from a local camera 1028, or from other sources such as USB 1026. DBB 1002 may also send a video stream to display 1020 that is received from various sources such as the cellular network via RF transceiver 1006 or camera 1028. DBB 1002 may also send a video stream to an external video display unit via encoder 1022 over composite output terminal 1024. Encoder unit 1022 can provide encoding according to PAL/SECAM/NTSC video standards. In some embodiments, audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc.

Other Embodiments

While the invention has been described with reference to illustrative embodiments, this description is not intended to be construed in a limiting sense. Various other embodiments of the invention will be apparent to persons skilled in the art upon reference to this description. For example, positioning information may be received from space vehicles or land based sources. Land based sources may include WiFi sources in which the fixed position of the source is known and correlated to the MAC address of the WiFi source. In this case, the position engine may perform triangulation of three-five WiFi sources in order to determine a position. Static heading determination may be used as described herein to help smooth the resulting position determination.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Embodiments of the decoders and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized accelerators. A stored program in an onboard or external (flash EEP) ROM or FRAM may be used to implement aspects of the static heading detection processing. Analog-to-digital converters and digital-to-analog converters provide coupling to the real world, modulators and demodulators (plus antennas for air interfaces) can provide coupling for waveform reception of position data being broadcast over the air by satellite, TV stations, cellular networks, etc or via WiFi networks such as the Internet.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for navigation, the method comprising:
    determining heading readings continuously using data from a sensor in a personal navigation device;
    selecting heading readings corresponding to a periodic event;
    determining that a portion of the selected headings have a value within a range;
    declaring the personal navigation device is moving in a static heading when the portion of the selected heading readings have a value within the range,
    receiving position data from a plurality of beacon sources;
    discarding data from at least one of the beacon sources that is inconsistent with the representative heading when a static heading is declared; and
    determining an estimated trajectory of the personal navigation device using remaining data received from beacon sources.

2. The method of claim 1, wherein determining that a portion of the selected headings have a value within the range comprises:
    determining a representative heading from the selected heading readings; and
    determining that a portion of the selected headings have a value within a range of the representative heading.

3. The method of claim 1, wherein determining that a portion of the selected headings have a value within the range comprises:
    computing a variance of the selected heading readings; and
    determining that the range of the variance is less than a threshold value.

4. The method of claim 1, further comprising
    determining an estimated trajectory of the personal navigation device using data received from beacon sources; and
    smoothing the estimated trajectory using a representative heading when a static heading is declared.

5. The method of claim 1, further comprising calibrating the sensor using the representative heading when a static heading is declared.

6. The method of claim 1, wherein the periodic event is indicative of periodic motion of the personal navigation device while a person carrying the device is walking.

7. The method of claim 1, wherein the periodic event is time based.

8. The method of claim 1, wherein the selected headings are stored in a buffer of length N.

9. The method of claim 8, wherein the buffer is emptied after each determination of the representative heading.

10. The method of claim 8, wherein the buffer is a circular buffer and a representative heading is determined each time a selected heading is stored in the buffer.

11. The method of claim 8, wherein the range is a function of N.

12. The method of claim 1, wherein the portion of the selected headings comprise odd or even headings.

13. The method of claim 1, wherein the declared static heading is a mean value of the selected headings.

14. A personal navigation device, comprising:
    a sensor operable to provide heading readings indicative of motion of the personal navigation device (PND);
    a processing engine coupled to receive the heading readings from the sensor, the processing engine configured to:
        select heading readings corresponding to a periodic event;
        determine that a portion of the selected headings have a value within a range;
        declare the personal navigation device is moving in a static heading when the portion of the selected heading readings have a value within the range,
    a second processing engine configured to determine an estimated trajectory of the personal navigation device using position data received from a plurality of beacon sources, wherein the second processing engine is configured to:
        discard data from at least one of the beacon sources that is inconsistent with the representative heading when a static heading is declared; and
        determine an estimated trajectory of the personal navigation device using remaining data received from beacon sources.

15. The personal navigation device of claim 14, further comprising:
    a second processing engine configured to determine an estimated trajectory of the personal navigation device using data received from beacon sources; and
    smoothing logic coupled to receive the static heading, the smoothing logic configured to smooth the estimated trajectory using the representative heading when a static heading is declared.

16. The personal navigation device of claim 14, wherein the processing engine is configured to determine a periodic event correlated to periodic motion of the PND resulting from steps being taken by a user while carrying the PND.

17. The personal navigation device of claim 14, wherein the processing engine is further operable to store the selected heading readings in a buffer of length N; and wherein the range is a function of N.

18. The personal navigation device of claim 14, further comprising:
    a display screen operable to display the estimated trajectory of the PND; and
    a radio transceiver with data processing logic coupled to the display screen, the transceiver operable to send and receive cellular telephone voice and data streams via a cellular network.

* * * * *